INVENTOR.
LEWIS P. REITZ Jr.
BY
HIS ATTORNEY

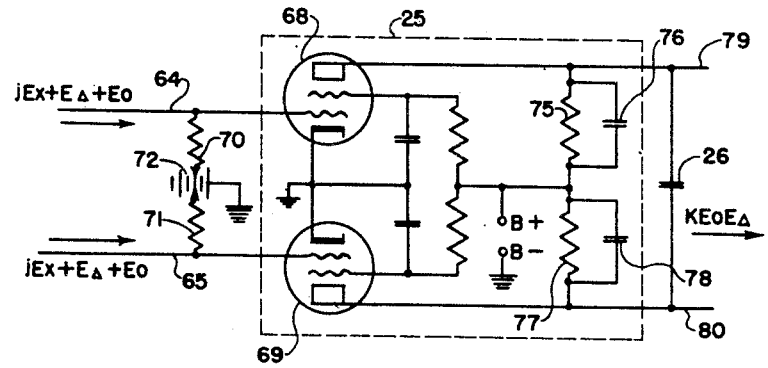
FIG. 7
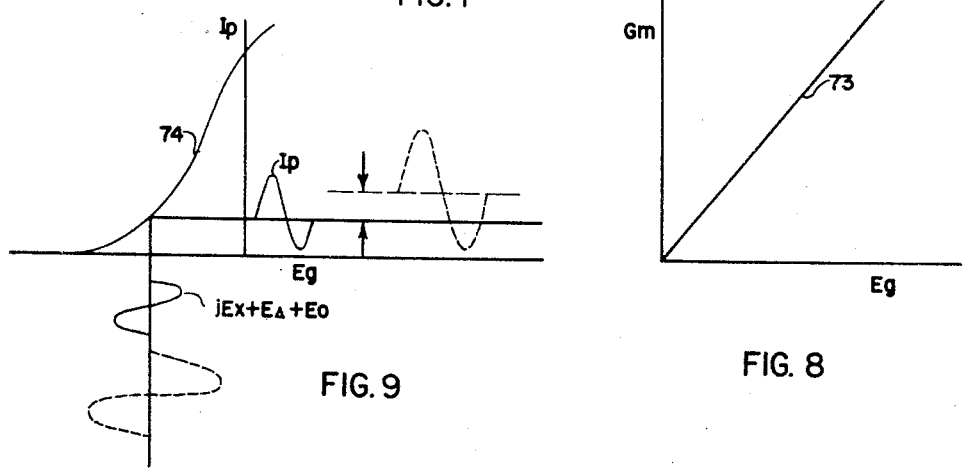
FIG. 9
FIG. 8
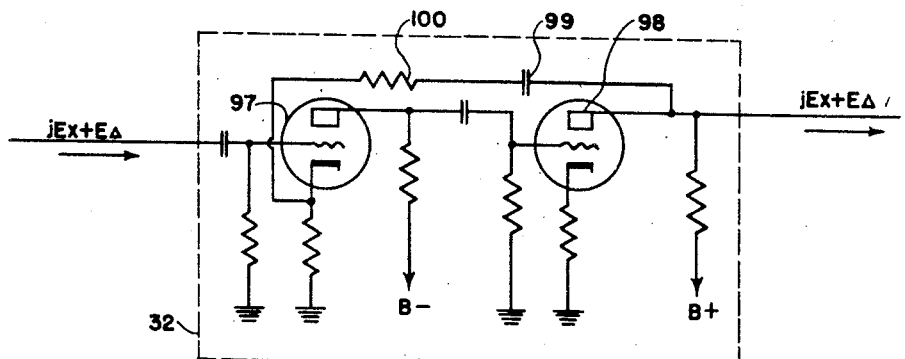
FIG. 11
INVENTOR.
LEWIS P. REITZ, Jr.
BY
HIS ATTORNEY June 19, 1951  L. P. REITZ, JR  2,557,798
MEASURING AND RECORDING DEVICE
Filed March 19, 1946  4 Sheets-Sheet 4

Patented June 19, 1951

2,557,798

UNITED STATES PATENT OFFICE 2,557,798

MEASURING AND RECORDING DEVICE

Lewis P. Reitz, Jr., Millington, N. J., assignor, by mesne assignments, to Raytheon Manufacturing Company, a corporation of Delaware Application March 19, 1946, Serial No. 655,559

6 Claims. (Cl. 175—183)

The present invention relates to automatic measuring, recording and indicating apparatus. More particularly, the present invention relates to the automatic measuring, indicating and recording of the resistive and reactive components of an impedance as functions of frequency or of any independent variable. The present invention further relates to measuring, indicating and recording the complex gain of electrical networks as a function of frequency or other independent variable.

Heretofore, most devices for impedance measurement have been slow in operation and generally give capacity and inductance values rather than reactance values. The present invention provides an apparatus for measuring, indicating and recording directly the reactance and resistance values of a complex impedance. According to the present invention an alternating current of substantially constant amplitude is passed through the complex impedance to be measured. The resulting voltage drop is treated electronically in such a manner as to operate one or more closed cycle servo mechanisms which indicate the resistive and reactive components. The resulting measurement may be indicated by means of cathode ray tubes or recorders. For example, a direct recording of resistance, reactance and impedance as functions of frequency or of any independent variable of any two-terminal network, such as a loud speaker, can be obtained. Moreover, a record can also be obtained of the complex gain of any three-terminal network, such as an amplifier or filter.

Figure 1:
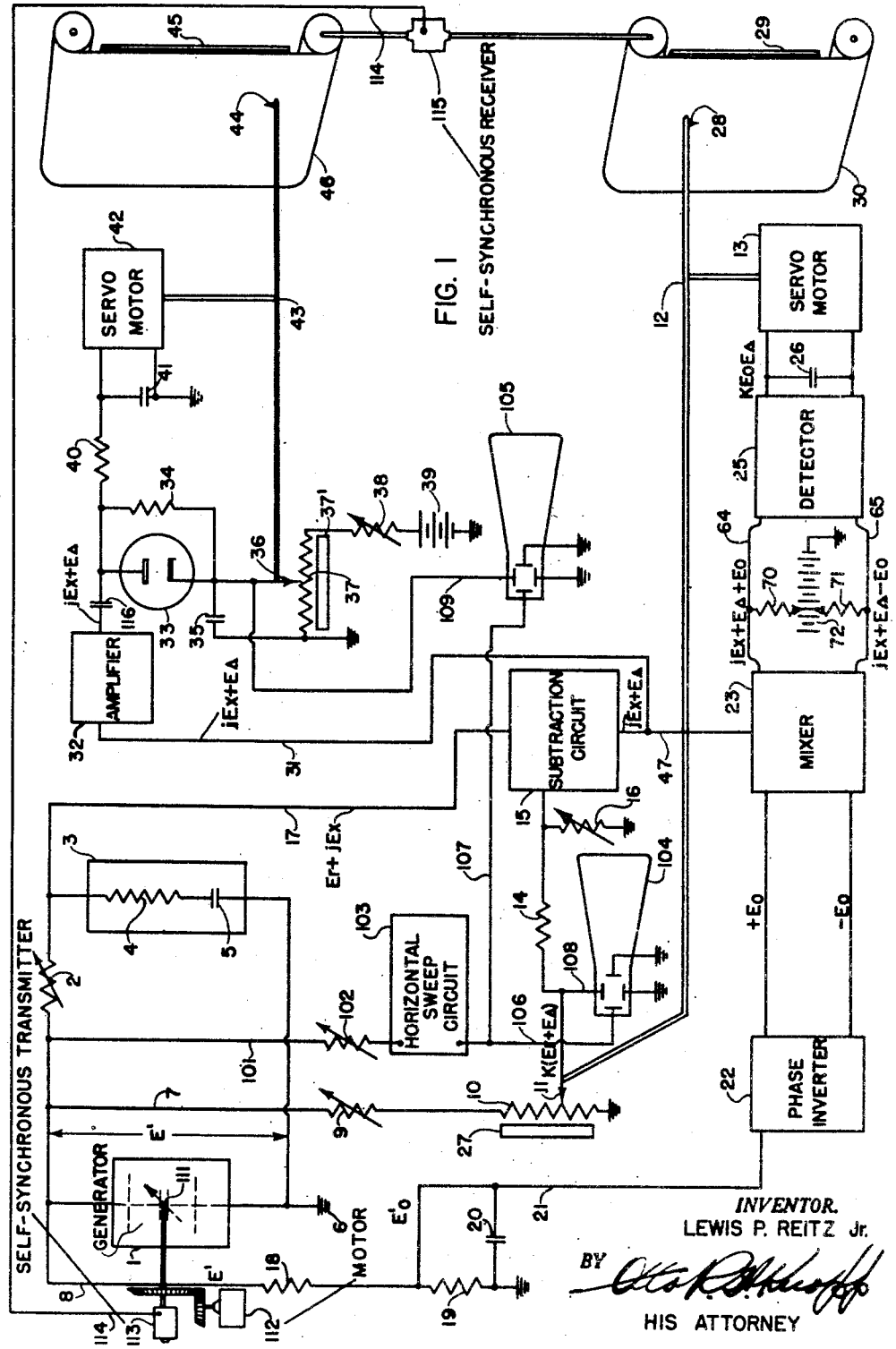
Figure 3:
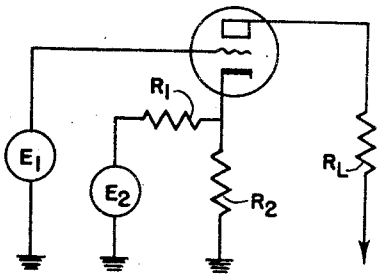
Figure 4:
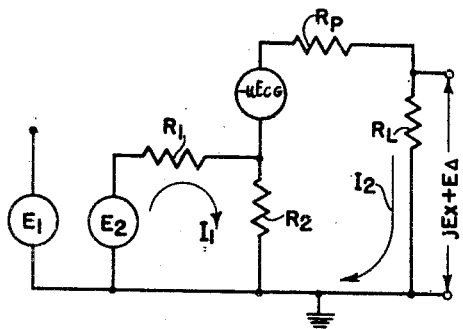

The above and other objects of my invention as well as the construction and operation of the same will best be understood from the following description taken in connection with the accompanying drawings in which Fig. 1 is a schematic diagram of the general circuit; Figs. 2, 5, 6, 7, 10, and 11 are schematic diagrams of suitable circuit elements for use in the general circuit shown in Fig. 1; Figs. 3 and 4 are circuit diagrams explanatory of Fig. 2; and Figs. 8 and 9 are curves illustrating the operation of the circuit of Fig. 7.

Referring now to Fig. 1, a signal generator 1 provides a testing voltage of substantially constant amplitude at the desired frequency. If it be desired to measure impedance magnitudes with respect to frequency, the generator 1 must be able to produce a variable frequency and preferably a continuously variable frequency. For example, if the condenser 111, shown dotted in the box which represents generator 1, represents the frequency varying element, it may be rotated by a motor 112, and where a record is desired, a self-synchronous transmitter motor 113 may have its shaft rotated in synchronism with the condenser shaft. The transmitter motor 113 is diagrammatically shown connected by cable 114 to self-synchronous receiver motor 115. Motor 115 may directly or through any desired amplifying arrangement be connected to drive the record paper feed of recorders 29 and 45. By this means the record paper will be moved synchronously with and at rate proportional to the rate of frequency change of generator 1.

The output of the generator 1 is impressed across the unknown impedance 3, which is illustrated as having resistance and capacitance components 4 and 5 respectively. In series with the generator is a variable resistance 2 which is preferably of a large value compared to the unknown impedance 3 so that substantially constant current will flow through the impedance 3. The opposite terminals of generator 1 and of the impedance 3 are grounded at 6. Substantially all voltages in the system and involved in the ensuing discussion are measured with respect to ground.

The voltage across the unknown impedance 3 is $$E_z = E_r + jE_x \qquad (1)$$

Thus the voltage $E_r$ is directly proportional to the resistive component of the unknown impedance and the voltage $jE_x$ is directly proportional to the reactive component of the unknown impedance.

The signal generator 1 supplies a voltage 'E' to three parallel circuits: the first, including the unknown impedance 3, has already been described; the second commences with conductor 7; and the third commences with conductor 8. In series with conductor 7, between the generator and ground, is a variable range-control resistor 9 and a potentiometer 10. The voltage E' between the generator and ground has the same phase as the voltage $E_r$, inasmuch as the voltage $E_r$ is that which is proportional to the resistive component of the load 3 which is connected across the generator. The voltage drop across the potentiometer 10 is reduced to substantially the same magnitude as the voltage $E_r$ by means of the range control resistor 9. Movable contact 11 of potentiometer 10 is automatically adjusted by a mechanical link 12, operated by a servo mechanism 13, as will be described later.

Figure 2:
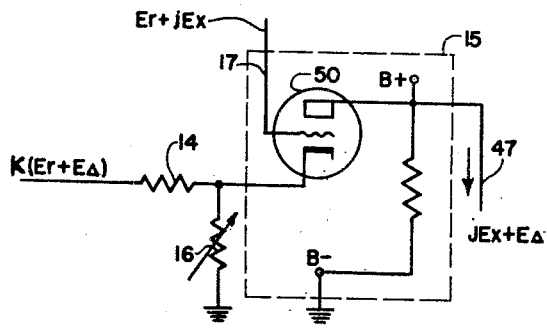

Potentiometer contact 11 is connected to a subtraction circuit 15 (an example of which is shown in Fig. 2 and will be described below) through a calibrating resistance network comprising series resistance 14 and variable shunt resistance 16. The subtraction circuit 15 is also connected to the ungrounded end of the unknown impedance 3 by means of the conductor 17. Because the branch circuit consisting of resistor 9 and potentiometer 10 is entirely resistive, the voltage between potentiometer contact 11 and ground can be expressed as equal to $K(E_r+E_\Delta)$ where $K$ is a constant and $E_\Delta$ is an error voltage, the magnitude of which, as will be shown later, approaches zero. The voltage supplied to the subtraction circuit 15 through conductor 17 is the voltage $E_z$ as shown in Equation 1. The output voltage of circuit 15 is the difference between the two input voltages, namely $$(E_r+E_\Delta)-(E_r+jE_x)=jE_x+E_\Delta \quad (2)$$

Figure 5:
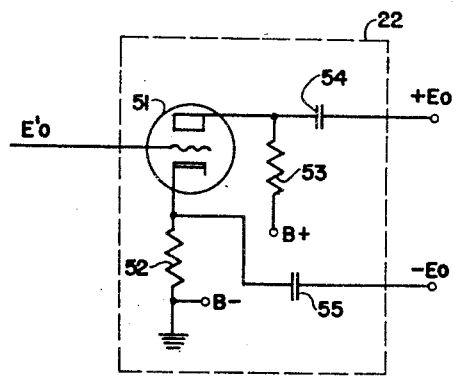

The path 8 from the signal generator 1 includes series resistors 18 and 19 between the signal generator and ground to provide a voltage of reduced magnitude. The voltage $E'_0$ is led to a phase inverter circuit 22 and reappears at the output of the same as two voltages balanced with respect to ground namely $+E_0$ and $-E_0$. A suitable phase inverter circuit is shown in Fig. 5 and described below.

Figure 6:
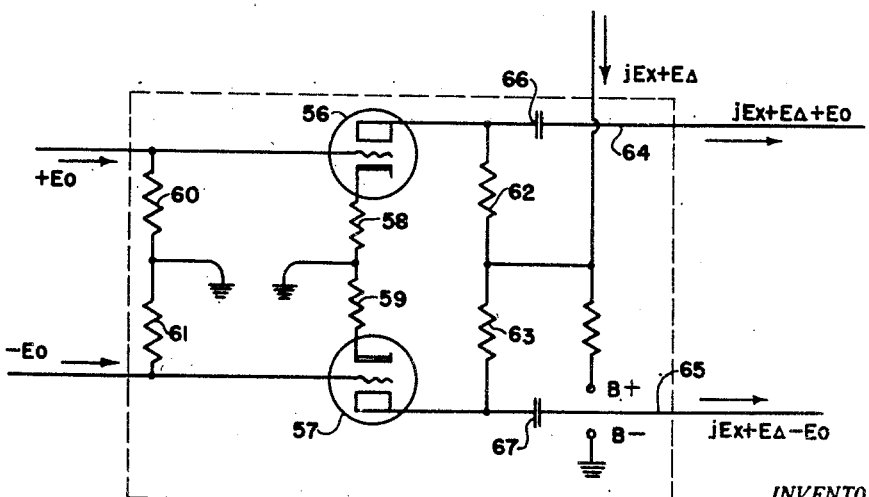

The two voltages, $+E_0$ and $-E_0$, are individually added to the voltage $jE_x+E$ in the mixer circuit 23, a suitable example of which is shown in Fig. 6. The output voltage of one half of the mixer circuit can then be written $$E_0+(jE_x+E_\Delta)$$

and of the other half $-E_0+(jE_x+E_\Delta)$. Since $E_0+E_\Delta$ are each resistive components of voltage having no phase difference when referred to a common source, these two values can be written $(E_0+E_\Delta)+jE_x$ and $(-E_0+E)+jE_x$. These two voltage are fed into the two halves of the push-pull square law detector circuit 25, an example of which is shown in Fig. 7, where the voltage magnitudes are individually squared. The outputs of the two square law detectors are so connected that the magnitude of one is subtracted from that of the other, leaving a net voltage magnitude equal to $KE_0E_\Delta$ where $K$ is some constant. A further discussion of this result is given below with reference to Fig. 7. The latter voltage appears as a direct voltage since alternating components are removed by the condenser 26 shunted across the output of detector 25. Thus the magnitude of the direct voltage $KE_0E_\Delta$ is directly proportional to the error voltage $E_\Delta$.

The direct voltage is supplied to a servo mechanism 13, which produces a positive, negative or zero mechanical torque on the mechanical link 12 depending upon whether the error voltage $E_\Delta$ is positive, negative, or zero respectively. The mechanical link 12 is connected to operate potentiometer contact 11 as mentioned above. The servo mechanism 13 is preferably a zero level, closed cycle servo mechanism, namely a device whose mechanical output torque is proportional in magnitude and direction to the magnitude and polarity of the input signal and whose input power is negligible compared to the output power. A suitable form of servo mechanism is illustrated schematically in Fig. 10. The mechanical torque produced by servo mechanism 13 automatically adjusts potentiometer contact 11 to the point where $E_\Delta$ is zero. The voltage between potentiometer contact 11 and ground is then proportional to $E_r$ and to the resistive component of the unknown impedance. The position of contact 11 in conjunction with a suitable calibrated scale 27 may directly indicate a resistive component 4, or the voltage drop between contact 11 and ground may be indicated on a meter or on a cathode ray tube.

In order to produce a record I prefer to have the mechanical link 12 of the servo 13 also operate a recording stylus 28 of a recorder 29 whose recording paper 30 is moved in synchronism with variations in frequency of the signal generator 1. This may be carried out by any of the methods well known in the art.

For the measuring and recording of the reactance component of the voltage $E_z$, the output voltage of the subtraction circuit 15, namely $jE_x+E_\Delta$, is led by way of conductor 31 to an amplifier 32 of conventional design, for example, as illustrated in Fig. 11. The amplified voltage $jE_x+E_\Delta$ is rectified by a diode rectifier circuit including a series condenser 116, diode 33 and resistor 34. The cathode of the diode 33 and the corresponding end of resistor 34 are connected to ground through condenser 35, whereby alternating components of the rectified voltage $jE_x+E_\Delta$ are passed to ground. The cathode end of resistor 34 is also connected to ground through the adjustable contact 36 of a potentiometer 37 which is grounded at one end. The other end of the potentiometer is connected through an adjustable series resistance 38 to a direct voltage source 39 and thence to ground. The voltage of the source 39 is reduced by resistance 38 to a value approximately equal to the output voltage of diode 33 and is of opposite polarity. Thus, the direct current component of the rectified voltage $jE_x+E_\Delta$ which appears across the resistance 34 has in series with it in opposite polarity the voltage drop across a portion of the potentiometer 37. The adjustable contact 36 of the potentiometer is operated by the servo mechanism 42 as explained below. The servo mechanism 42 may be similar to servo 13 and may be of the type shown in Fig. 10. The operating voltage for the servo mechanism is the resultant of the voltage across resistor 34 and potentiometer 37. When potentiometer 37 is adjusted by the servo mechanism so that its voltage drop is exactly equal to that across resistor 34, the position of the potentiometer contact will be such that the voltage across a portion of the potentiometer is exactly proportional to the voltage $jE_x+E_\Delta$. When, however, the resistance measuring portions of the circuit, as previously described, have operated to make $E_\Delta$ equal to zero, the position of potentiometer contact 36 will be a measure of the reactive component $jE_x$ of the voltage $E_z$.

The servo mechanism 42, through mechanical link 43, positions adjustable contact 36 of the potentiometer 37 to the point where the voltage input to the servo 42 is zero. At this point therefore the voltage between potentiometer contact 36 and ground is proportional to $jE_x$. The position of contact 36 in relation to a suitably calibrated scale 37' may be used to give a direct reading of the reactance component of the unknown impedance 3, or the voltage drop between contact 36 and ground may be measured by a meter or indicated on a cathode ray tube.

I prefer, however, in order to obtain a record of the reactance component, to arrange the servo mechanical linkage 43 so that it also drives stylus 44 of recorder 45 to produce a record on chart paper 46 which is preferably moved in synchronism with frequency variations of signal generator 1 as suggested above. If desired, the stylus 44 may be mounted on the same recorder as stylus 28 whereby records of both resistance and reactance of the unknown impedance 3 may be simultaneously produced as functions of frequency.

A cathode ray tube presentation of the resistance and reactance components of the unknown impedance as functions of frequency may be obtained with my invention in place of a record. For this purpose, as illustrated in Fig. 1, voltage from the generator 1, which is preferably cyclically varying in frequency, is led by way of conductor 101 and calibrating resistance 102 to a cathode ray tube horizontal sweep circuit 103. This circuit may be of any suitable form well known in the art. It should provide suitable potential to sweep the beams of the cathode ray tubes 104 and 105 horizontally across the screens of the tubes in synchronism with the frequency variations of signal generator 1. To this end sweep circuit 103 is connected by conductor 106 to the horizontal deflecting plates of cathode ray tube 104 and through conductor 107 to the horizontal deflecting plates of cathode ray tube 105. Vertical deflection of the beam of tube 104 is produced by the adjusted voltage across potentiometer 10 and is therefore proportional to the resistance component of the unknown impedance 3. To this end the vertical plates of cathode ray tube 104 are connected by conductor 108 to movable contact 11 of potentiometer 10. Similarly, vertical deflection of the beam of cathode ray tube 105 is made proportional to the adjusted voltage drop across potentiometer 37. By connecting the vertical deflecting plates of cathode ray tube 105 to movable contact 36 of the potentiometer 37 by way of conductor 109, the vertical deflections of the beam of the cathode ray tube 105 are therefore proportional to the reactance of the unknown impedance 3.

While various circuit arrangements can be used for the block elements shown in Fig. 1, suitable examples of some of these are shown in Figs. 2 to 11 inclusive. The subtraction circuit 15 may, for example, be constructed as shown in Fig. 2. The junction of resistors 14 and 16 is connected to the cathode of triode 50 whose grid, by conductor 17, is supplied with the voltage $E_x$ across the unknown impedance, namely $E_r+jE_x$. The voltage $K(E_r+E_\Delta)$ reduced by calibrating resistance 14 is applied across variable cathode resistor 16. The resultant anode output voltage is then $jE_x+E_\Delta$. This will best be understood by considering the basic equivalent circuit of Fig. 2 which may be represented as in Fig. 3. The grid voltage is here replaced by $E_1$ and the cathode voltage by $E_2$. This circuit is in turn equivalent to the circuit of Fig. 4 in which $R_1$ represents the resistor 14 and $R_2$ represents the resistor 16. $R_p$ is the tube plate resistance and $R_L$ is the plate load. If, further, we let $\mu$ equal the amplification factor of the tube; $e_g$ the resulting grid to cathode potential; $I_1$, the current in mesh $E_2$, $R_1$, $R_2$; and $I_2$ the current in mesh $R_p$, $R_L$, $R_2$, $\mu e_g$; then solving the two mesh currents simultaneously it can be shown that $$I_2 = \frac{-E_1 + [f_1(R_1, R_2)]E_2}{\frac{1}{\mu}[f_2(R_1, R_2)]} \quad (3)$$

where $[f_1(R_1,R_2)]$ represents a first function of $R_1$ and $R_2$, and $[f_2(R_1,R_2)]$ represents a second function of $R_1$ and $R_2$. Thus, by proper adjustment of $R_1$ and $R_2$, namely resistances 14 and 16 in Fig. 1, the output voltage of the circuit 15 between conductor 47 and ground can be made equal to the vector difference of the two input voltages; that is, $R_1$ and $R_2$ can be so chosen that $$f_2(R_1,R_2) = \mu R_L$$

and $$f_1(R_1,R_2) = 1$$

so that relation (3) becomes $$I_2 R_1 = E_2 - E_1$$

The phase inverter 22 may employ a circuit like that shown in Fig. 5. This comprises a triode 51 having its grid supplied with the voltage $E'_0$. The cathode is connected to ground through resistor 52, and the anode is supplied with plate voltage through resistor 53. The alternating voltages between cathode and ground and between anode and ground are opposite in phase, and by proper adjustment of the circuit constants the cathode circuit output $-E_0$ can be made substantially equal in magnitude to the plate circuit output $+E_0$. Blocking condensers 54 and 55 are provided in the anode and cathode circuits respectively.

The mixer circuit 23 may be as shown in Fig. 6. This circuit comprises two triodes 56 and 57. The cathodes of these are tied together through balancing resistors 58 and 59 and connected to ground. The two voltages $+E_0$ and $-E_0$ are supplied to the grids across resistors 60 and 61 balanced with respect to ground. The plates of tubes 56 and 57 are connected together through plate resistors 62 and 63, plate voltage being supplied to the junction of these resistors. The voltage $jE_x+E_\Delta$ which is to be mixed with $+E_0$ and $-E_0$ is also connected to the junction of resistors 62 and 63, so that the former voltage is added to the two input voltages in the plate circuits of the tubes 56 and 57. The two output conductors 64 and 65 are connected to the plate circuits through blocking condensers 66 and 67. There thus appears in the outputs, that is, between conductors 64 and 65 and ground, respectively, the complex voltages $(jE_x+E_\Delta+E_0)$ and $(jE_x+E_\Delta-E_0)$ respectively.

The square law detector circuit 25 may, for example, be in the form shown in Fig. 7. This comprises two electron tubes 68 and 69, both having a straight line transconductance characteristic 73, substantially as shown in the graph in Fig. 8, in which $g_m$ is the transconductance and $e_g$ is the grid voltage. The transfer characteristic 74 of both tubes 68 and 69 should be similar in shape and of the character indicated in the graph shown in Fig. 9, where the ordinates $I_p$ represent plate voltage and the abscissae $e_g$ represent grid voltage. Any absolute difference between the magnitudes of the transfer characteristics of the two tubes 68 and 69 may be equalized by means of resistors 70 and 71 connected between the input conductors 64 and 65 and grounded bias battery 72. The two tubes 68 and 69 are connected in push-pull with their cathodes connected together as shown. The two voltages $(jE_x+E_\Delta+E_0)$ and $(jE_x+E_\Delta-E_0)$ are applied to the grids. Alternating components in the outputs of the two tubes are suppressed by resistance condenser combinations 75, 76 and 77, 78. The resultant direct voltage drop across the extremities of the two series connected resistors 75 and 77 is then equal to $KE_0E_\Delta$. This follows from a consideration of the characteristics of the two tubes. Let us assume that for each tube $I_p$ equals grid voltage and $g_m$ equals tube transconductance. An increase in $e_g$ increases the direct component of the output voltage due to the straight line shape of the $g_m-e_g$ characteristic of the tube (Fig. 8); that is, $$g_m = Ke_t = \frac{\delta i_p}{\delta e_t}$$

and, integrating:

$$i_p = K_1 e^2_g \quad (4)$$

In other words, the voltage drops across resistances 75 and 77 are respectively proportional to the squares of the input voltages. Thus, bearing in mind that the voltages $[(E_0+E_\Delta)+jE_x]$ and $[(-E_0+E_\Delta)+jE_x]$ are vector quantities, we find that the voltages across resistances 75 and 77 are respectively:

$$E_{75} = [\sqrt{(E_0+E_\Delta)^2 + (jE_x)^2}]^2 =$$
$$(E_0^2 + 2E_0 E_\Delta + E_\Delta^2 - E_x^2)$$

and $$E_{77} = [\sqrt{(-E_0+E_\Delta)^2 + (jE_x)^2}]^2 =$$
$$(E_0^2 - 2E_0 E_\Delta + E_\Delta^2 - E_x^2)$$

Since these voltage drops are in opposite directions, a subtraction takes place. Thus, with alternating components removed by condenser 26, the voltage between conductors 79, 80 is equal to $4E_0 E_\Delta$. The magnitude of this direct voltage is therefore directly proportional to the error voltage $E_\Delta$. When the servo mechanism 13 has properly adjusted potentiometer contact 11, $E_\Delta$ becomes zero and therefore the signal voltage to the servo likewise becomes zero.

Figure 10:
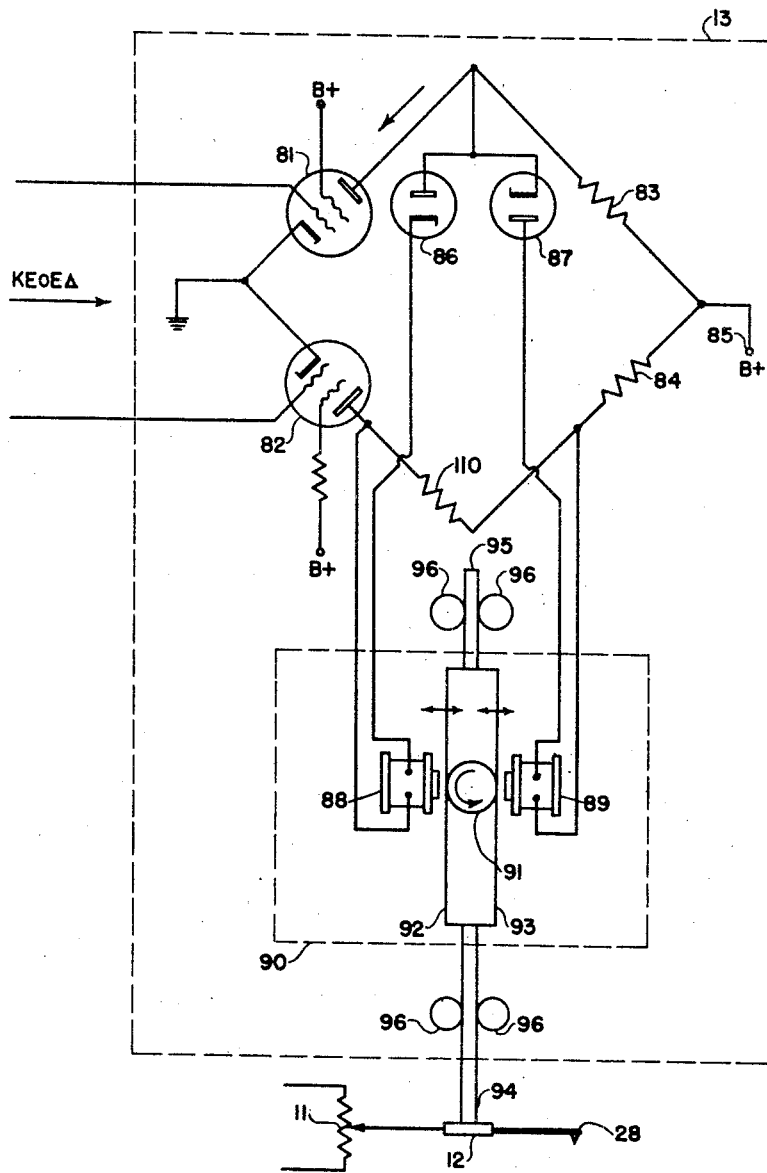

A suitable form of servo mechanism and circuit is shown diagrammatically in Fig. 10. Two electron tubes 81 and 82 are connected into a bridge circuit, with the cathodes of the triodes connected together and to ground. The anodes are connected respectively through resistors 83 and 84 to anode voltage supply 85. Two diode rectifiers 86 and 87 are connected in parallel in opposite polarity across the anodes of the two two tubes 81 and 82. In circuit with the diode 86 is one magnetic clutch coil 88 of a servomotor 90. The other clutch coil 89 of the servomotor is in circuit with diode 87. The voltage $KE_0 E$ is applied to the grids of the two tubes 81 and 82. If the polarity of this voltage is such as to make the grid of tube 82 positive so that it conducts more current, the tube 86 will conduct more current and increase the current through clutch coil 88, actuating the servomotor in one direction. On the other hand, if the polarity of the input voltage is reversed, clutch coil 89 will be energized, operating the servomotor in the opposite direction. A resistor 110 in the bridge circuit maintains a continuous residual current through both magnet coils 88 and 89. When $E_\Delta$ is zero, and consequently the input voltage $KE_0 E_\Delta$ is zero, the servomotor will stop.

A useful type of servomotor may have a continuously rotating drum 91 arranged in close proximity to a pair of friction plates 92 and 93 arranged on opposite sides of the drum 91. Plates 92 and 93 are furthermore fastened together on a carriage having extensions 94 and 95 free to move longitudinally between rollers 96. The coils 88 and 89 serve to press one or the other of plates 92 and 93 against the rotating drum 91 whereby the carriage 94 moves in either one or the other direction. Mechanically coupled to the carriage 94 is potentiometer contact 11 and stylus 28 whereby the potentiometer contact and the recorder stylus are simultaneously operated, so that the stylus will draw a graph of the resistance component of the unknown impedance relative to the frequency variations of the voltage supplied by signal generator 1.

For the recording of the reactance component of the unknown impedance 3, the amplifier 32 may have the form shown in Fig. 11. This comprises a two-stage resistance coupled amplifier having two triodes 97 and 98. Feedback is provided by condenser 99 and resistance 100 between the output of tube 98 and the input of tube 97 to maintain a flat frequency response characteristic. The servo mechanism 42 is similar to the servo mechanism 13 shown in Fig. 10 except that one of the triodes, for example 82, may be omitted with a resistor substituted in its place having the same value as the resistance of tube 81 with zero applied grid voltage.

While according to Fig. 1 I have shown the generator's signal applied to the phase inverter circuit, it will be understood by those skilled in the art that instead of this, the subtraction circuit voltage can be applied to the phase inverter and the generator voltage mixed with it.

Having now described my invention, I claim:

1. Apparatus for measuring the resistance component of a complex impedance comprising a voltage source arranged to impress a signal voltage across said impedance under conditions of substantially constant current through the latter, a first substantially purely resistive element connected across said source, a second resistive element connected across said source, means connected to said second element to furnish first and second voltages of equal lesser magnitude than said signal voltage and mutually opposite phase, a movable tap connected to said first element and adapted to derive a third voltage therefrom, a subtraction circuit, means providing said third voltage and the complex voltage across said complex impedance to said subtraction circuit, said subtraction circuit producing a voltage proportional to their difference, means connected to said subtraction circuit for adding said difference voltage separately to each of said first and second voltages, means operative upon the two resulting sums to provide a second difference voltage, and servo-mechanism means responsive to the sense of said second difference voltage and operative upon said movable tap to alter said third voltage in a sense to reduce said second difference voltage to zero.

2. Apparatus for measuring the reactance of a complex impedance comprising a source of voltage arranged to impress a signal voltage across said impedance under conditions of substantially constant current therethrough, substantially purely resistive means connected across said source, a movable tap connected to said resistive means whereby to provide a voltage proportional in magnitude to the resistive component of said impedance, a subtraction circuit, means to provide said last-named voltage and the complex voltage across said impedance to said circuit, said circuit being adapted to provide an output voltage proportional in magnitude to their difference, rectifier means connected to the output of said subtraction circuit for rectifying said output voltage, means providing a reference voltage in opposition to said rectified voltage, and servo-mechanism means responsive to the sense of the rectified output voltage of said rectifier arranged to adjust said reference voltage to be equal in magnitude to said rectified voltage.

3. Apparatus as in claim 1 including indicator means linked to said servo-mechanism means for indicating the magnitude of said third voltage as so altered.

4. Apparatus as in claim 2 including means linked to said servo-mechanism means for indicating the magnitude of said reference voltage as so adjusted.

5. Apparatus for measuring the resistance and reactance components of a complex impedance comprising a voltage source arranged to impress a signal voltage across said impedance under conditions of substantially constant current through the latter, a first substantially purely resistive element connected across said source, a second resistive element connected across said source, means connected to said second element to furnish first and second voltages of equal lesser magnitude than said signal voltage and mutually opposite phase, a movable tap connected to said first element and adapted to derive a third voltage therefrom, a subtraction circuit, means providing said third voltage and the complex voltage across said complex impedance to said subtraction circuit, said subtraction circuit producing a voltage proportional to their difference, means connected to said subtraction circuit for adding said difference voltage separately to each of said first and second voltages, means operative upon the two resulting sums to provide a second difference voltage, and servo-mechanism means responsive to the sense of said second difference voltage and operative upon said movable tap to alter said third voltage in a sense to reduce said second difference voltage to zero, means also connected to the output of said subtraction circuit for rectifying the output voltage thereof, means providing a reference voltage in opposition to said rectified voltage, and second servo-mechanism means responsive to the sense of said rectified voltage arranged to adjust said reference voltage to be equal in magnitude to said rectified voltage.

6. Apparatus for measuring the resistance and reactance components of a complex impedance comprising a voltage source arranged to impress a signal voltage across said impedance under conditions of substantially constant current through the latter, a first substantially purely resistive element connected across said source, a second resistive element connected across said source, means connected to said second element to furnish first and second voltages of equal lesser magnitude than said signal voltage and mutually opposite phase, a movable tap connected to said first element and adapted to derive a third voltage therefrom, a subtraction circuit, means providing said third voltage and the complex voltage across said complex impedance to said subtraction circuit, said subtraction circuit producing a voltage proportional to their difference, means connected to said subtraction circuit for adding said difference voltage separately to each of said first and second voltages, means operative upon the two resulting sums to provide a second difference voltage, and servo-mechanism means responsive to the sense of said second difference voltage and operative upon said movable tap to alter said third voltage in a sense to reduce said second difference voltage to zero, means also connected to the output of said subtraction circuit for rectifying the output voltage thereof, means providing a reference voltage in opposition to said rectified voltage, and second servo-mechanism means responsive to the sense of said rectified voltage arranged to adjust said reference voltage to be equal in magnitude to said rectified voltage, and separate individual means linked to each of said servo-mechanism means for separately indicating the respective magnitudes of said third voltage as so altered and of said reference voltage as so adjusted.

LEWIS P. REITZ, Jr

REFERENCES CITED

The following references are of record in the file of this patent:

UNITED STATES PATENTS

| Number | Name | Date |
|---|---|---|
| 1,660,405 | Affel | Feb. 28, 1928 |
| 2,149,256 | Geyger | Mar. 7, 1939 |
| 2,258,677 | Dresser | Oct. 14, 1941 |
| 2,302,230 | Livingston | Nov. 17, 1942 |

OTHER REFERENCES

Electronics, May 1943, pages 86–88, 176 and 178.

Certificate of Correction

Patent No. 2,557,798                                                   June 19, 1951

LEWIS P. REITZ, Jr.

It is hereby certified that error appears in the printed specification of the above numbered patent requiring correction as follows:

Column 2, line 35, for "voltage E" read *voltage E'*; column 3, line 30, for "$jE_x + E$" read $jE_x + E_\Delta$; line 40, for "$(-E_o + E)$" read $(-E_o + E_\Delta)$; line 41, for "voltage" read *voltages*; column 7, line 47, for "$KE_oE$" read $KE_oE_\Delta$;

and that the said Letters Patent should be read as corrected above, so that the same may conform to the record of the case in the Patent Office.

Signed and sealed this 11th day of September, A. D. 1951.

[SEAL]

THOMAS F. MURPHY,
*Assistant Commissioner of Patents.*